United States Patent
Piewek et al.

(10) Patent No.: US 12,464,326 B2
(45) Date of Patent: Nov. 4, 2025

(54) METHOD FOR TRANSMITTING A PLURALITY OF SIGNALS AND METHOD FOR RECEIVING A PLURALITY OF SIGNALS

(71) Applicant: Volkswagen Aktiengesellschaft, Wolfsburg (DE)

(72) Inventors: Jan Piewek, Magdeburg (DE); Andreas Udo Sass, Hannover (DE); Jens Jeschke, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 784 days.

(21) Appl. No.: 17/786,475

(22) PCT Filed: Dec. 15, 2020

(86) PCT No.: PCT/EP2020/086096
§ 371 (c)(1),
(2) Date: Jun. 16, 2022

(87) PCT Pub. No.: WO2021/122512
PCT Pub. Date: Jun. 24, 2021

(65) Prior Publication Data
US 2022/0329991 A1   Oct. 13, 2022

(30) Foreign Application Priority Data
Dec. 17, 2019   (DE) .......................... 102019219922.4

(51) Int. Cl.
*H04W 4/40* (2018.01)
*G06F 17/11* (2006.01)
(Continued)

(52) U.S. Cl.
CPC ............... *H04W 4/40* (2018.02); *G06F 17/11* (2013.01); *G07C 5/008* (2013.01); *G07C 5/0808* (2013.01)

(58) Field of Classification Search
None
See application file for complete search history.

(56) References Cited

U.S. PATENT DOCUMENTS

| 2005/0261893 A1 | 11/2005 | Toyama et al. |
| 2014/0358487 A1 | 12/2014 | Shin |

(Continued)

FOREIGN PATENT DOCUMENTS

| DE | 3620424 A | 12/1987 |
| DE | 102006055737 A1 | 5/2008 |

(Continued)

OTHER PUBLICATIONS

PCT/EP2020/086096. International Search Report (Mar. 26, 2021).

*Primary Examiner* — Andre Tacdiran
(74) *Attorney, Agent, or Firm* — Peter Zura; LOZA & LOZA, LLP (57) ABSTRACT

Technologies and techniques for transmitting a plurality of signals. A plurality of signals are picked up in a time window. The signals from the plurality of signals that have a similar signal form in the time window may be grouped into a respective group. A signal of the respective group may be determined or designated as representative of the group. Transmission data may be transmitted that contains, for each group, the representative of the respective group and a respective portion of transformation information for each signal contained in the respective group.

20 Claims, 4 Drawing Sheets

(51) Int. Cl.
*G07C 5/00* (2006.01)
*G07C 5/08* (2006.01)

(56) References Cited

U.S. PATENT DOCUMENTS

| | | | |
|---|---|---|---|
| 2019/0220011 | A1 | 7/2019 | Della Penna |
| 2020/0149998 | A1* | 5/2020 | Ayyagari ............... G06N 3/088 |
| 2021/0152233 | A1* | 5/2021 | Pan .................... H04B 7/06952 |
| 2021/0223764 | A1* | 7/2021 | Nasu .................. G05B 23/0221 |
| 2022/0118870 | A1* | 4/2022 | Kosseifi ................... G08G 5/59 |

FOREIGN PATENT DOCUMENTS

| | | |
|---|---|---|
| DE | 602005005640 T2 | 5/2009 |
| EP | 10600 B1 | 5/1980 |
| EP | 1536567 A1 | 6/2005 |
| EP | 1764923 A1 | 3/2007 |

\* cited by examiner

METHOD FOR TRANSMITTING A PLURALITY OF SIGNALS AND METHOD FOR RECEIVING A PLURALITY OF SIGNALS

RELATED APPLICATIONS

The present application claims priority to International Patent Application No. PCT/EP2020/086096 to Piewek et al., titled "Method for Transmitting a Plurality of Signals and Method for Receiving a Plurality of Signals", filed Dec. 15, 2020, which claims priority to German Patent App. No. 10 2019 219 922.4, filed Dec. 17, 2019, the contents of each being incorporated by reference in their entirety herein.

TECHNICAL FIELD

The present disclosure relates to the transmission of data. More specifically, the present disclosure relates to technologies and techniques for transmitting and receiving a plurality of signals.

BACKGROUND

Increasing volumes of data are transmitted within a vehicle, but also out of the vehicle or into the vehicle. In particular, in the case of data transmissions out of the vehicle and into the vehicle, the available bandwidth for the transmission of data is often limited.

Document DE 60 2005 005 640 T2, which relates to the processing of audio signals, for example, provides representing a plurality of audio channels by a composite monophonic audio channel and sidechain information for the individual channels of the plurality of audio channels, so as to be able to transmit the plurality of audio channels even at a low bit rate. This approach, however, is disadvantageous in cases where signals, at times, deviate considerably from one another.

Furthermore, document EP 1 764 923 A1 provides a method for coding a multi-channel signal (for example, audio signal or medical signal). The signal of at least one of the channels is independently coded, while the signals of the other channels are difference-coded. One of the independently coded signals is used in each case as the reference signal for the difference coding.

A need exists to provide an improved option for transmitting multiple signals in a data-saving manner out of the vehicle or into the vehicle.

SUMMARY

Aspects of the present disclosure are directed to a method for transmitting a plurality of signals, a method for receiving a plurality of signals, and by a vehicle according to the independent claims. Further aspects as well as refinements of the present disclosure are described in the dependent claims, the detailed description, and the figures.

In some examples, a method is disclosed for transmitting a plurality of signals. The method comprises picking up or storing the plurality of signals in a time window. The time window can be both fixed and variable. The picked-up signals may be arbitrary signals of an entity that are to be transmitted.

In some examples, signals of the plurality of picked-up signals that have a (relatively) similar signal waveform in the time window may be grouped into respective groups. In other words, the plurality of picked-up signals are divided into one or more groups, where the signals in one group in each case have a similar waveform. A few examples are provided below as to how the similarity of the signals with respect to one another can be determined. The similarity of the signals with respect to one another can, for example, be determined based on expert knowledge. For example, it may be known that signals that represent a certain type of information are similar to one another and can thus be grouped. As an alternative, the signals can also be correlated, or a linear dependence between the signals may be determined so as to determine the similarity of the signals. It is also possible to determine (or calculate) a respective difference between the signals, for example, and the difference can be compared to a threshold value so as to determine the similarity. Likewise, it can be checked, for example, whether the signals have a rising or a falling waveform in the time window so as to determine the similarity of the signals. However, it should be noted in the process that the aforementioned criteria are selected purely by way of example and serve only illustration purposes. It is also possible to use other or additional criteria for grouping the plurality of signals.

In some examples, a signal of the respective group may be configured as a representative of the group. The representative of the group may be a signal that is representative of all the signals of the group. The representative of a group can be determined in a variety of ways. For example, the differences of the individual signals of a group with respect to one another can be determined, and the signal that, in sum, is the least different from the other signals of the particular group can be determined as the representative. Likewise, the grouping of the signals and the determination of the representative of the respective groups can be combined. For example, one of the plurality of signals can be arbitrarily selected and compared to further signals of the plurality of signals. As long as the further signals are similar to the arbitrarily selected signal, they are assigned to the group of the arbitrarily selected signal, and the arbitrarily selected signal is the representative of this group. The first further signal that is not similar to the arbitrarily selected signal is determined as a representative of a further group and is now compared to the still remaining or not yet grouped signals of the plurality of signals, instead of the arbitrarily selected signal. In the event of similarity with the representative of the further group, they are analogously assigned to the further group, or one or more additional groups are formed in this way. However, it must be noted that the two aforementioned approaches for determining the representative are selected purely by way of example and serve only illustration purposes. It is also possible to use other approaches for determining the representative.

In some examples, the method may include transmitting transmission data including, for each group, the representative of the respective group as well as a respective piece of transformation information for each signal contained in the respective group. For each group, only the respective representative of the group is thus transmitted, not, however, the further signals of the group, by means of the transmission data. The respective piece of transformation information indicates a relation between the respective signal and the representative of the group in which the respective signal is contained. By taking advantage of the similarity of individual signals of the plurality of signals with respect to one another, the plurality of signals can be transmitted in a data-saving manner by means of the representatives of the groups as well as the pieces of transformation information. The data volume to be transmitted can be considerably reduced compared to the picked-up signals. The method according to the present disclosure thus enables a data-saving transmission of multiple signals. The transmission data can be transmitted both in a wired manner (for example, via a data bus) and wirelessly (for example, via a cellular network or a local wireless network).

The present disclosure likewise relates to a control unit for a vehicle comprising the herein-described device according to the present disclosure. Accordingly, the control unit can exchange (that is, send and/or receive) the plurality of signals both with other components of the vehicle and with external entities (for example, a back-end of a vehicle manufacturer or of a service provider) in a data-saving manner.

The present disclosure also relates to a server or a server array comprising the above-described device according to the present disclosure. Accordingly, the server or the server array can exchange (that is, send and/or receive) the plurality of signals both internally and with external entities (for example, a vehicle) in a data-saving manner.

Further exemplary embodiments are computer programs for carrying out one of the methods described herein when the computer program runs on a computer, a processor or a programmable hardware component. Depending on certain implementation requirements, exemplary embodiments of the present disclosure can be implemented as hardware or tangibly-embodied software. The implementation can be carried out using a digital storage medium, for example a floppy disk, a DVD, a Blu-Ray disc, a CD, a ROM, a PROM, an EPROM, an EEPROM or a flash memory, a hard drive or another magnetic or optical memory, on which electronically readable control signals are stored, which can cooperate, or cooperate, with a programmable hardware component in such a way that the respective method is carried out.

A programmable hardware component can be formed by a processor, a computer processor (central processing unit (CPU)), a graphics processor (graphics processing unit (GPU)), a computer, a computer system, an application-specific integrated circuit (ASIC), an integrated circuit (IC), a one-chip system (system on a chip (SOC)), a programmable logic element or a field-programmable gate array (FPGA) comprising a microprocessor.

The digital storage medium can therefore be machine-readable or computer-readable. Some exemplary embodiments thus comprise a data carrier, which includes electronically readable control signals able to cooperate with a programmable computer system or a programmable hardware component in such a way that one of the methods described herein is carried out. An exemplary embodiment is thus a data carrier (or a digital storage medium or a computer-readable medium) on which the program for carrying out one of the methods described herein is recorded.

BRIEF DESCRIPTION OF THE DRAWINGS

Exemplary embodiments of the present invention will be described in more detail hereafter with reference to the accompanying figures. In the drawings.

DETAILED DESCRIPTION

In some examples disclosed herein, the transmission data for each group of a plurality of groups can include pieces (portions) of identification information which indicate or identify signals contained in the respective group. The pieces of identification information can, for example, comprise the names or identifiers (IDs) of the respective grouped signals.

In some exemplary embodiments, the plurality of signals may be normalized prior to grouping, so that the signal amplitudes of all picked-up signals are within a predetermined value range. A respective piece of normalization information which characterizes the normalization of the respective signal is determined for each normalized signal of the plurality of signals. The respective piece of normalization information can, for example, indicate a normalization factor and an offset of the normalization of the respective signal. Accordingly, the respective piece of transformation information comprises the respective piece of normalization information. In other words, the transmission data contain, for each group, the representative as well as additionally the respective piece of normalization information of each signal contained in the respective group. Further data reduction can be achieved by normalizing the signals prior to the data transmission.

In some examples, a respective deviation may be determined from the representative of the respective group for each further signal in this group (that is, for each signal of the respective group which is not the representative of this group). In other words, the deviation with respect to the waveform representing the group is determined for the further signals in each group.

When the respective deviation from the representative of the respective group for a further signal in this group is greater than a predetermined deviation, the respective portion of transformation information comprises a respective portion of deviation information, which represents the deviation of the respective further signal from the representative of this group. The portion of deviation information allows a receiver of the transmission data to more exactly reconstruct the respective further signal. Conversely, when the respective deviation from the representative of the respective group for a further signal in this group is smaller than the predetermined deviation, the respective portion of transformation information does not comprise any deviation information. Accordingly, a maximum data reduction can be achieved for the respective signal. When a lossy transmission of the signals is allowed or permissible, a maximum data reduction can thus take place by foregoing the transmission of the respective portion of deviation information in the case of minor deviations of a signal from its representative.

If no lossy transmission of the signals is allowed or permissible, the portion of transformation information for each further signal in the respective group can comprise a respective portion of deviation information which represents the deviation of the respective further signal from the representative of this group. A receiver of the transmission data can exactly reconstruct the signals by means of the respective portion of deviation information.

Analogously to the signals themselves, it is also possible to group the portion of deviation information in some examples, and to transmit only a respective representative of the portions of deviation information, so as to further reduce the data volume to be transmitted. Similar portions of deviation information may be grouped into a respective information group. A portion of deviation information of the respective information group may be determined as a representative of the information group. Accordingly, the transmission data for each information group comprise the representative of the respective information group, not, however, the further portion of deviation information of the respective information group. In addition, the transmission data can include a respective second portion of transformation information for each portion of deviation information contained in the respective group. The respective second portion of transformation information characterizes the deviation of the respective portion of deviation information from the representative of the information group in which the respective portion of deviation information is contained. The representative of the respective information group can be transmitted together with the second portion of transformation information for the further portion of deviation information in the respective information group in a more data-saving manner than the portion of deviation information itself. Optionally, the transmission data for the respective information group can also comprise second portions of identification information which indicate for which signals portions of deviation information are contained in the respective group.

According to some exemplary embodiments, the transmission data may be compressed via a compression method prior to transmission. For example, compression methods such as run-length encoding (RLE), the Lempel-Ziv-Welch (LZW) algorithm or the deflate algorithm can be used for this purpose. Accordingly, the transmission data can be further compressed, and the data volume to be transmitted can thus be further reduced.

As indicated herein, the length of the time window can be settable or dynamic. In some exemplary embodiments, the length of the time window can thus depend on one or more of the criteria listed below. For example, the length of the time window can depend on an operating state of an entity which generates the plurality of signals. Depending on the operating state of the entity, the waveforms of the plurality of signals or at least of parts thereof can change more or less extensively. Accordingly, the data transmission according to the invention can be adapted to the behavior of the entity. The length of the time window can also depend on a type of the portions of information represented by the plurality of signals. Depending on the type of the represented portions of information, the waveforms of the plurality of signals or at least of parts thereof can change more or less extensively. Accordingly, the data transmission according to the invention can be adapted to the expected signal changes.

The length of the time window can likewise depend on a predetermined data volume being reached while the plurality of signals is being picked up. If, for example, the predetermined data volume is reached, the time window can be closed or an end of the time window can be determined. Accordingly, the data transmission according to the invention can be dynamically adapted to the volume of data to be transmitted. The length of the time window can also depend on a maximum window length predefined by a receiver of the transmission data. For example, the receiver can operate at a certain refresh rate so that the data transmission, and thus the window length, must be matched to the refresh rate. However, it must be noted in the process that the aforementioned criteria are selected purely by way of example and serve only illustration purposes. It is also possible to use other or additional criteria for setting the length of the time window.

According to some exemplary embodiments, an entity utilizing the techniques herein may be a vehicle, for example. Generally speaking, a vehicle can be interpreted as a device that comprises one or more engines as well as wheels driven thereby. The vehicle can thus be both a car or a commercial vehicle. For example, a vehicle can be a passenger car, a truck, a motorcycle or a tractor. The method according to the invention can thus enable the data-saving transmission of the plurality of signals, both within the vehicle and out of the vehicle. Accordingly, the operating state can, for example, be a speed or an acceleration of the vehicle, a position of a gas pedal, a steering angle or any other variable that can be set or influenced by a user of the vehicle.

In some exemplary embodiments, the processes disclosed herein may be repeated for one or more further time windows following the time window, so as to enable dynamic grouping of the plurality of signals, and thus a data-saving transmission of the signals. For example, the plurality of signals may be picked up in a further time window following the time window. The plurality of signals picked up in the further time window that have a similar waveform in the further time window may be grouped into a respective further group, analogously to the above comments. A signal of the respective further group may be determined as a representative of the further group according to the above principles. Further transmission data may be transmitted, containing, for each further group, the representative of the respective further group as well as a respective portion of transformation information for each signal contained in the respective further group.

As indicated above, the length of the respective time window can be set dynamically or as a function of the situation. Accordingly, the length of the further (that is, the second) time window, according to some exemplary embodiments, can differ from the length of the (first) time window.

In some examples, a method is disclosed for receiving a plurality of signals. The method comprises receiving reception data containing a respective representative of the group for a plurality of groups of signals, as well as a respective portion of transformation information for each signal contained in the respective group. The signals in a respective group of the plurality of groups in each case have a similar waveform in a time window. The respective representative of a group of the plurality of groups may be a signal that is contained in the respective group and that represents the signals contained in the respective group. For each group, only the respective representative of the group is thus received, not, however, the further signals of the group, by means of the transmission data. The reception data can thus in particular have been generated and transmitted in accordance with the above-described method for transmitting a plurality of signals (the reception data corresponding to the transmission data of the method for transmitting a plurality of signals). The reception data can be received both in a wired manner (for example, via a data bus) and wirelessly (for example, via a cellular network or a local wireless network).

In some examples, the plurality of signals may be determined from the representatives of the plurality of groups, as well as the portions of transformation information for the signals contained in the plurality of groups. In other words, the plurality of signals may be reconstructed from the representatives of the plurality of groups as well as the portions of transformation information for the signals contained in the plurality of groups. The plurality of signals may be reconstructed from the reception data transmitted in a data-saving manner in accordance with the method according to the invention. This, in turn, enables a data-saving reception of multiple signals.

Analogously to the above, the reception data for each group can also include portions of identification information which indicate or identify signals contained in the respective group. Accordingly, the individual signals can be identified on the receiver side.

When the portion of transformation information for a first of the plurality of signals contains a portion of normalization information which characterizes a normalization of the first of the plurality of signals, the determination of the plurality of signals according to some exemplary embodiments comprises scaling the representative of the group in which the first of the plurality of signals is contained, based on the portion of normalization information for the first of the plurality of signals, so as to obtain the first of the plurality of signals. The portion of normalization information is thus utilized to determine the first of the plurality of signals from the representative of the group in which the first of the plurality of signals is contained.

When the portion of transformation information for the first of the plurality of signals additionally contains a portion of deviation information that represents a deviation of the first of the plurality of signals from the representative of its group, the determination of the plurality of signals comprises modifying the representative of the group in which the first of the plurality of signals is contained, based on the portion of deviation information for the first of the plurality of signals prior to scaling. The portion of deviation information enables a more precise reconstruction of the first of the plurality of signals, based on the representative of the group.

According to exemplary embodiments, the signals transmitted by means of the reception data can also be transmitted without prior normalization. When the portion of transformation information for a further signal of the group which differs from the representative of its group additionally contains a portion of deviation information that represents a deviation of the further signal from the representative of its group, the determination of the plurality of signals can thus alternatively comprise modifying the representative of the group in which the further signal is contained, based on the portion of deviation information for the further signal, so as to obtain the further signal.

In some exemplary embodiments, the reception data can also be compressed so as to further reduce the data volume to be transmitted. Accordingly, the reception data may also be decompressed via a decompression method prior to determining the plurality of signals.

According to exemplary embodiments, the method for receiving a plurality of signals, for example, from a vehicle, can be utilized to receive the plurality of signals from an external entity or a vehicle-internal entity.

The present disclosure also relates to a device comprising at least one programmable hardware component, which is configured to carry out methods/processes for data transmission as described herein.

The present disclosure also relates to a vehicle comprising device described herein. Accordingly, the vehicle can exchange (that is, send and/or receive) the plurality of signals both internally and with external entities (for example, a back-end of a vehicle manufacturer or of a service provider) in a data-saving manner.

Figure 1:
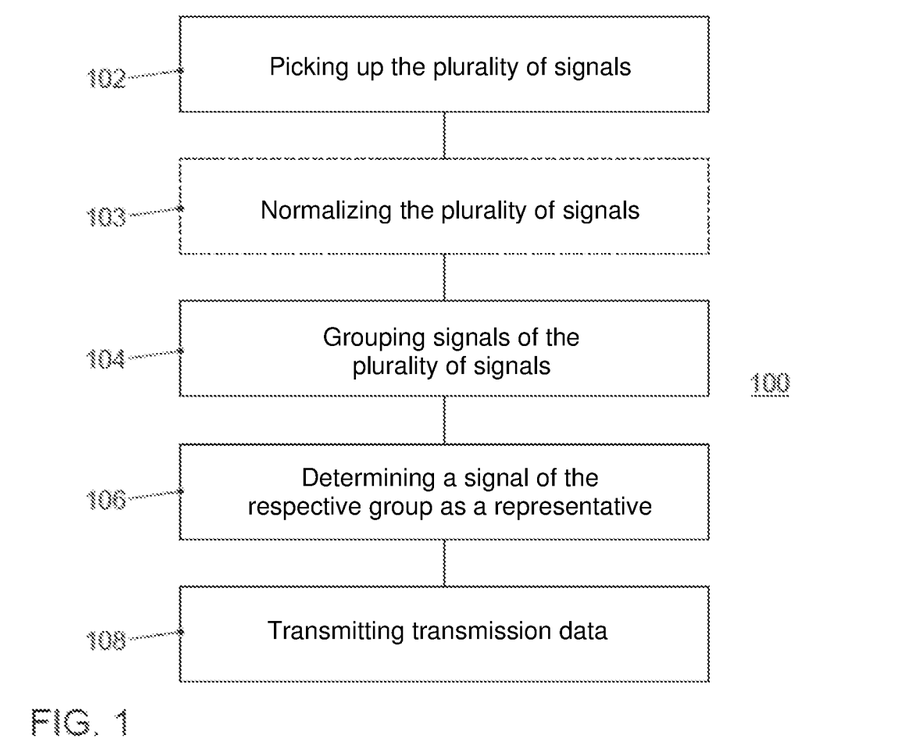
FIG. 1 shows a flow chart of an illustrative method for transmitting a plurality of signals under some aspects of the present disclosure.
Figure 2:
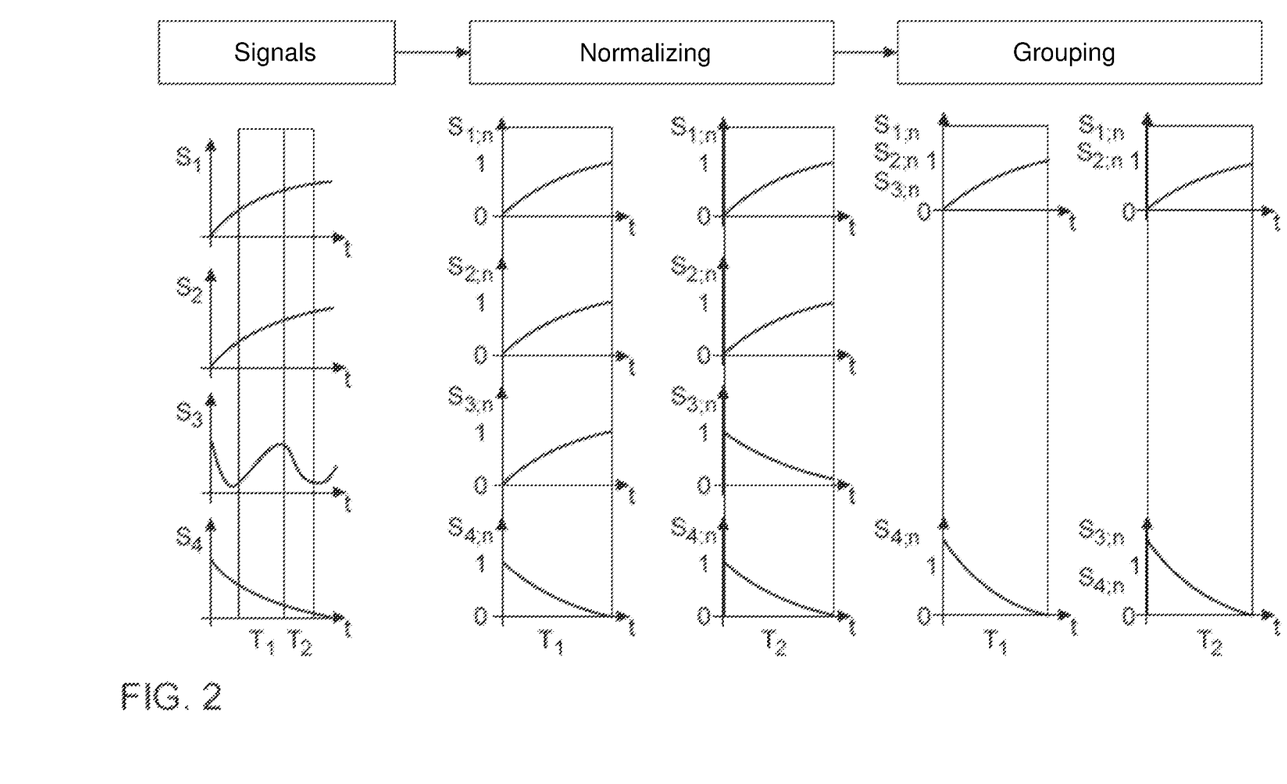
FIG. 2 shows an exemplary embodiment of a plurality of signals and the processing thereof during the transmitting the plurality of signals, under some aspects of the present disclosure.

FIG. 1 shows a flow chart of one exemplary embodiment of a method 100 for transmitting a plurality of signals. Chronological profiles of an exemplary plurality of signals $S_1$, $S_2$, $S_3$ and $S_4$ are shown in the left area of FIG. 2. However, it must be noted in the process that the four signals shown in FIG. 2 are selected purely by way of example and purely serve illustration purposes. It is also possible for any arbitrary other plurality of signals to be transmitted.

The method 100 initially comprises picking up 102 the plurality of signals in a time window $T_1$.

The method 100 in addition optionally comprises normalizing 103 the plurality of signals $S_1$ to $S_4$. As is apparent in the central portion of FIG. 2, each of the signals $S_1$ to $S_4$ is in the predetermined value range of 0 to 1 after normalization. For each normalized signal $S_{1,n}$ to $S_{4,n}$ of the plurality of signals $S_1$ to $S_4$, a respective piece of normalization information which characterizes the normalization of the respective signal $S_1$ to $S_4$ is determined. The normalized or relative waveforms $S_{1,n}$ to $S_{4,n}$ can, for example, be determined according to the following mathematical expression:

$$S_{i,n} = \frac{S_i - S_{i,min}}{S_{i,max} - S_{i,min}} \quad (1)$$

Here, $S_{i,n}$ denotes the normalized waveform of the respective signal (where i=1 to 4 in the example of FIG. 2), $S_i$ denotes the respective signal, $S_{i,min}$ denotes the minimum of the respective signal during the considered time window, and $S_{i,max}$ denotes the maximum of the respective signal during the considered time window.

Thereafter, the method 100 comprises grouping (clustering) 104 signals of the plurality of signals which have a similar waveform in the first time window $T_1$ into a respective group. During the first time window $T_1$, the normalized signals $S_{1,n}$, $S_{2,n}$ and $S_{3,n}$ have a similar waveform, as is apparent in the right area of FIG. 2, and they are accordingly grouped into a first group. The normalized signal $S_{4,n}$ has a waveform that differs from the normalized signals $S_{1,n}$, $S_{2,n}$ and $S_{3,n}$ and is accordingly grouped into a second group.

The method 100 hereafter comprises determining 106 a signal of the respective group j as a representative $R_3$ of the group j. For example, the normalized signal $S_{2,n}$ can be determined as a representative $R_1$ of the first group (j=1), and the normalized signal $S_{4,n}$ can be determined as a representative $R_2$ of the second group (j=2).

The method 100 furthermore comprises transmitting 108 transmission data containing, for each group j, the representative $R_3$ of the respective group j as well as a respective piece of transformation information for each signal contained in the respective group j. For example, for the example of FIG. 2, the normalized waveform $S_{2,n}$ of the signal $S_2$ can be transmitted as the representative $R_1$ of the first group (j=1), and for each signal $S_1$, $S_2$ and $S_3$, the respective piece of transformation information can be transmitted. Accordingly, the normalized waveform $S_{4,n}$ of the signal $S_4$ is transmitted as a representative $R_2$ of the second group (j=2), and additionally the piece of transformation information for the signal $S_4$ is transmitted.

During the normalization of the signals $S_1$ to $S_4$ prior to grouping, a respective piece of normalization information which characterizes the normalization of the respective signal $S_i$ is determined for each normalized signal $S_{i,n}$ of the plurality of signals $S_1$ to $S_4$. The respective piece of transformation information comprises the respective piece of normalization information.

The transmission data for the two groups can optionally also comprise pieces of identification information which identify signals contained in the respective group.

The signals $S_1$ to $S_4$ can be transmitted in a data-saving manner according to the method 100.

In addition, the method 100 can optionally comprise one or more of the above-described features.

For example, a respective deviation of the further signals with respect to the representative of the respective group can be determined for each group j. This can take place as follows, for example:

$$DSN_i = S_{i,n} - R_j \qquad (2)$$

Here, $DSN_i$ denotes the respective deviation of one of the further (here, additionally normalized) signals $S_{i,n}$ with respect to the representative $R_3$ of its group. Accordingly, the transmission data for a group j of k signals can comprise the representative $R_j$ of the group as well as k pieces of normalization information for the k signals and k−1 pieces of deviation information which indicate the deviations of the k−1 further signals in the group j from the representative $R_j$.

It is also possible for the transmission data for one or more of the groups to be further compressed by applying a compression method prior to transmission 108. The compression method can, for example, be selected as a function of the representative $R_j$ of the respective group so as to select a suitable or favorable compression method.

The above-described aspects of the method are carried out analogously for the second time window $T_2$. In the example shown in FIG. 2, the signal profile of the signal $S_3$ differs considerably in the time windows $T_1$ and $T_2$. In the second time window $T_2$, the waveform of the signal $S_3$ is no longer similar to the waveforms of the signals $S_1$ and $S_2$ with which the signal $S_3$ formed a group during the first time window $T_1$.

During the second time window $T_2$, the waveform of the signal $S_3$ is similar to the waveform of the signal $S_4$ so that now these two signals form a group (see right area of FIG. 2). The waveforms of the signals $S_1$ and $S_2$ are also similar in the second time window $T_2$ so that the signals $S_1$ and $S_2$, in turn, form a group (see right area of FIG. 2).

Figure 3:
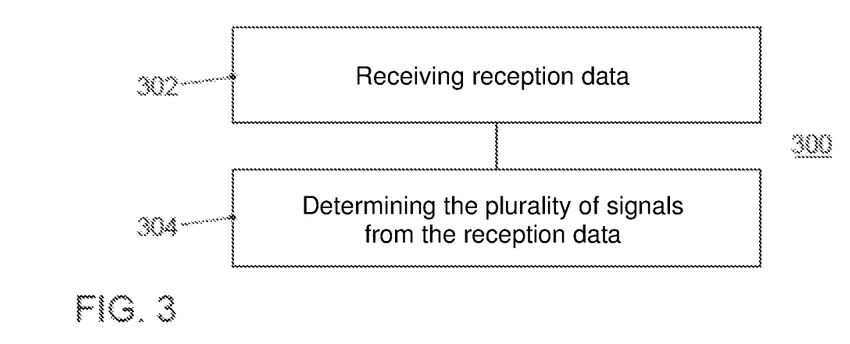
FIG. 3 shows a flow chart of an exemplary embodiment of a method for receiving a plurality of signals, under some aspects of the present disclosure.

The receiver-side reconstruction of the signals from the transmitted data is illustrated in FIG. 3. FIG. 3 shows a flow chart of one exemplary embodiment of a method 300 for receiving a plurality of signals.

The method 300 comprises receiving 302 reception data containing a respective representative of the group for a plurality of groups of signals, as well as a respective piece of transformation information for each signal contained in the respective group. The signals in a respective group of the plurality of groups in each case have a similar waveform in a time window. The respective representative of a group of the plurality of groups is a signal that is contained in the respective group and that represents the signals contained in the respective group.

In the example of FIG. 2, the reception data for the first time window $T_1$, for example, comprise the normalized waveform $S_{2,n}$ of the signal $S_2$ as a representative $R_1$ of the first group (j=1), the IDs $S_1$, $S_2$ and $S_3$ of the signals in the group, as well as the respective piece of transformation information for each signal $S_1$, $S_2$ and $S_3$. Accordingly, the reception data comprise the normalized waveform $S_4,n$ of the signal $S_4$ as a representative $R_2$ of the second group (j=2), the ID $S_4$ of the only signal in the group, and additionally the piece of transformation information for the signal $S_4$.

If the reception data are compressed, the method 300 can optionally comprise decompressing the reception data by means of a decompression method.

The method 300 comprises determining 304 the plurality of signals from the representatives of the plurality of groups as well as the pieces of transformation information for the signals contained in the plurality of groups.

When the pieces of transformation information for a further signal of the group which differs from the representative $R_j$ of its group additionally comprise a piece of deviation information, the determination of the plurality of signals comprises modifying the representative $R_j$ of the group in which the further signal is contained, based on the piece of deviation information for the further signal. This can take place as follows, for example:

$$S_{i,n}' = R_j + DSRN_i \qquad (3)$$

Here, $S_{i,n}'$ denotes the normalized waveform of the ith signal of the plurality of signals derived from the reception data.

Thereafter, the absolute waveform can take place with the transmitted piece of normalization information for the respective signal.

If the signals were not normalized prior to transmission, the step of scaling on the receiver-side can be dispensed with since the reception data do not contain corresponding pieces of normalization information.

Figure 4:
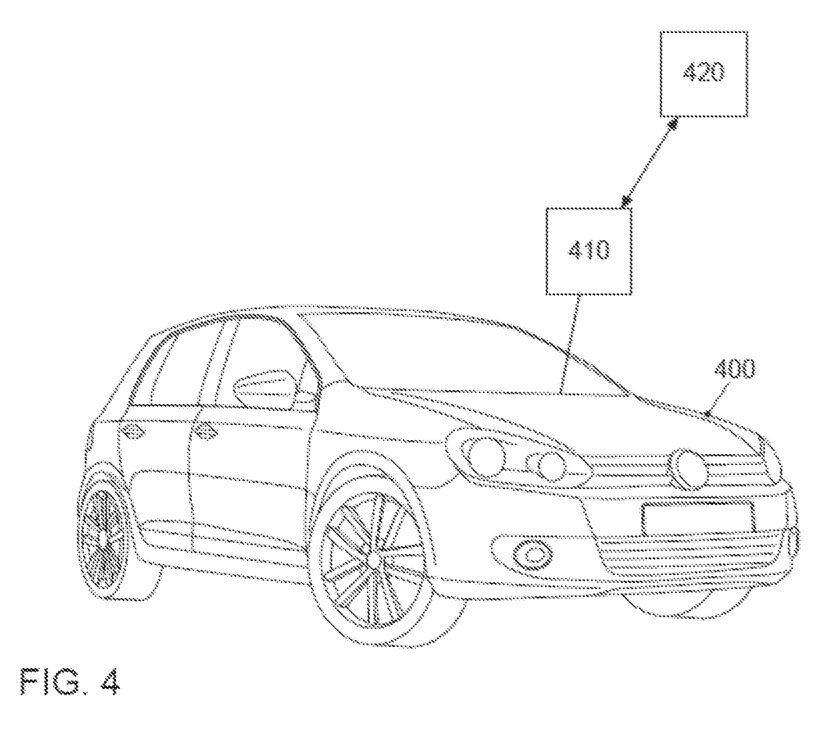
FIG. 4 shows an exemplary embodiment of a vehicle that communicates with a server under some aspects of the present disclosure.

FIG. 4 furthermore shows an exemplary embodiment of a vehicle 400 that utilizes the provided data transmission for exchanging data with a server 420. For this purpose, the vehicle 400 comprises a programmable hardware component 410, which is configured to carry out at least one of the provided methods.

For example, the provided data transmission can be utilized to transmit vehicle data from the vehicle 400 to the server 420. For example, it may be of interest to transmit pieces of information with respect to the electronic stability program (ESP) system from the vehicle 400 to the server 420, in addition to other vehicle data.

Typically, at least one speed signal per wheel is present in the ESP system. The speed signals all have similar signal profiles. During phases without ESP intervention, the speed signals almost have identical values. Accordingly, the speed signals can be grouped in one group. For example, the wheel speed signal of the front left wheel can now be determined as a representative. The speed signals of the front left wheel and of the rear right wheel can, for example, deviate by less than a predetermined deviation from the representative, so that only the respective piece of normalization information is transmitted for the speed signals. The speed signal of the rear left wheel can, for example, deviate by more than the predetermined deviation from the representative so that additionally the piece of deviation information is transmitted for this speed signal. During an ESP intervention, it may be necessary, for example, that the pieces of deviation information are also transmitted for the speed signals of the front right wheel and of the rear right wheel since the deviation with respect to the representative becomes greater, or the speed signals are divided into different groups since the signal profiles are no longer sufficiently similar during the ESP intervention.

It is also possible for signals of a wide variety of types to be grouped into a shared group for the transmission. If the vehicle 400 is moving at a constant speed, for example, a group of constant signals may form in which, in addition to the individual wheel speed signals, for example also a constant gear indicator signal, a constant turn signal lever status display signal, a constant on-board electrical system voltage display signal, and the like can be present.

The signals that have been grouped and transmitted according to the provided method can be reconstructed on the part of the server 420 according to the above principles and can thereafter be further processed.

According to exemplary embodiments, the data transmission can, conversely, also take place from the server 420 into the vehicle 400 if multiple signals (e.g., control signals) are to be transmitted from the server 420 into the vehicle 420.

LIST OF REFERENCE SIGNS 100 method for transmitting a plurality of signals
102 picking up the plurality of signals
103 normalizing the plurality of signals
104 grouping signals of the plurality of signals
106 determining a signal of the respective group as a representative of the group
108 transmitting transmission data
300 method for receiving a plurality of signals
302 receiving reception data
304 determining the plurality of signals
400 vehicle
410 programmable hardware component
420 server
$S_1$ signal
$S_{1,n}$ normalized signal
$S_2$ signal
$S_{2,n}$ normalized signal
$S_3$ signal
$S_{3,n}$ normalized signal
$S_4$ signal
$S_{4,n}$ normalized signal
$T_1$ first time window
$T_2$ second time window

The invention claimed is:

1. A method for transmitting a plurality of signals generated in a vehicle to a vehicle-external entity, comprising:
   picking up the plurality of signals in a time window;
   grouping signals of the plurality of signals into respective groups, wherein the signals of each group are determined to have a similar waveform in the time window based on one or more objective criteria, comprising a correlation metric, a signal difference threshold, a monotonic trend comparison, or any combination thereof;
   determining a signal of the respective group as a representative of the group; and
   wirelessly transmitting transmission data to the vehicle-external entity, the transmission data comprising only the determined representative of the respective group, and a respective portion of transformation information for each signal contained in the respective group, the respective portion of transformation information indicating a relation between the respective signal and the representative of the group.

2. The method according to claim 1, furthermore comprising:
   normalizing the plurality of signals prior to grouping;
   determining respective portion of normalization information that characterizes the normalization of the respective signal for each normalized signal of the plurality of signals,
   wherein the respective portion of transformation information comprises the respective portion of normalization information.

3. The method according to claim 1, furthermore comprising determining a respective deviation from the representative of the respective group for each further signal in the grouped signals.

4. The method according to claim 3, wherein, when the respective deviation from the representative of the respective group for a further signal in this group is greater than a predetermined deviation, the respective portion of transformation information comprises a respective portion of deviation information that represents the deviation of the respective further signal from the representative of this group.

5. The method according to claim 4, furthermore comprising:
   grouping similar portions of deviation information into a respective information group; and
   determining a portion of deviation information of the respective information group as a representative of the information group,
   wherein the transmission data for each information group comprises the representative of the respective information group, and not the further portion of deviation information of the respective information group.

6. The method according to claim 1, furthermore comprising compressing the transmission data prior to transmission.

7. The method according to claim 1, wherein the time window comprises a length of time that is dependent on one or more of the following criteria:
   a) an operating state of the vehicle,
   b) a type of the portions of information represented by the plurality of signals,
   c) reaching a predetermined data volume while picking up the plurality of signals, and
   d) a maximum window length predefined by the vehicle-external entity.

8. The method according to claim 1, furthermore comprising:
   picking up the plurality of signals in a further time window following the time window;
   grouping signals of the plurality of signals picked up in the further time window into respective further groups, wherein the signals of each further group are determined to have a similar waveform in the further time window based on one or more objective criteria, comprising a correlation metric, a signal difference threshold, a monotonic trend comparison, or any combination thereof;
   determining a signal of the respective further group as a representative of the further group; and
   transmitting further transmission data containing, for each further group, the representative of the respective further group, and a respective portion of transformation information for each signal contained in the respective further group.

9. The method according to claim 8, wherein a length of the further time window differs from a length of the time window.

10. A method for receiving a plurality of signals in a vehicle from a vehicle-external entity, comprising:

wirelessly receiving reception data from the vehicle-external entity, the reception data comprising
only one respective representative of a group of a plurality of signal groups,
a respective portion of transformation information for each signal contained in the respective group, wherein the signals in a respective group of the plurality of groups are determined to have a similar waveform in a time window based on one or more objective criteria, comprising a correlation metric, a signal difference threshold, a monotonic trend comparison, or any combination thereof,
wherein the respective representative of a group of the plurality of signal groups is a signal, contained in the respective group, representing the signals contained in the respective group, and the respective portion of transformation information indicating a relation between the respective signal and the representative of the group in which the respective signal is contained;
determining the plurality of signals from the representatives of the plurality of groups; and
determining the portions of transformation information for the signals contained in the plurality of groups.

11. The method according to claim 10, wherein, when the portion of transformation information for a first of the plurality of signals contains a portion of normalization information that characterizes a normalization of the first of the plurality of signals, the determining of the plurality of signals comprises:
scaling the representative of the group in which the first of the plurality of signals is contained, based on the portion of normalization information for the first of the plurality of signals, so as to obtain the first of the plurality of signals.

12. The method according to claim 11, wherein, when the portion of transformation information for the first of the plurality of signals additionally contains a portion of deviation information that represents a deviation of the first of the plurality of signals from the representative of its group, the determining of the plurality of signals comprises:
modifying the representative of the group in which the first of the plurality of signals is contained, based on the portion of deviation information for the first of the plurality of signals prior to scaling.

13. The method according to claim 10, wherein, when the portion of transformation information for a further signal of the group that differs from the representative of its respective group additionally contains a portion of deviation information which characterizes a deviation of the further signal from the representative of its group, the determining of the plurality of signals comprises:
modifying the representative of the group in which the further signal is contained, based on the portion of deviation information for the further signal, so as to obtain the further signal.

14. A vehicle for generating and transmitting a plurality of signals to a vehicle-external entity, comprising:
a communication device for communicating with the vehicle-external entity;
a processing apparatus, operatively coupled to the communication device, wherein the processing device is configured to
pick up the plurality of signals in a time window;
group signals of the plurality of signals into respective groups, wherein the signals of each group are determined to have a similar waveform in the time window based on one or more objective criteria, comprising a correlation metric, a signal difference threshold, a monotonic trend comparison, or any combination thereof;
determine a signal of the respective group as a representative of the group; and
wirelessly transmit transmission data to the vehicle-external entity via the communication device, the transmission data comprising only the determined representative of the respective group, and a respective portion of transformation information for each signal contained in the respective group, the respective portion of transformation information indicating a relation between the respective signal and the representative of the group.

15. The vehicle according to claim 14, wherein the processing device is further configured to:
normalize the plurality of signals prior to grouping;
determine respective portion of normalization information that characterizes the normalization of the respective signal for each normalized signal of the plurality of signals,
wherein the respective portion of transformation information comprises the respective portion of normalization information.

16. The vehicle according to claim 14, wherein the processing device is further configured to determining a respective deviation from the representative of the respective group for each further signal in the grouped signals.

17. The vehicle according to claim 16, wherein, when the respective deviation from the representative of the respective group for a further signal in this group is greater than a predetermined deviation, the respective portion of transformation information comprises a respective portion of deviation information that represents the deviation of the respective further signal from the representative of this group.

18. The vehicle according to claim 14, wherein the processing device is further configured to:
group similar portions of deviation information into a respective information group; and
determine a portion of deviation information of the respective information group as a representative of the information group,
wherein the transmission data for each information group comprises the representative of the respective information group, and not the further portion of deviation information of the respective information group.

19. The vehicle according to claim 14, wherein the processing device is further configured to compress the transmission data prior to transmission.

20. The vehicle according to claim 14, wherein the time window comprises a length of time that is dependent on one or more of the following criteria:
a) an operating state of the vehicle,
b) a type of the portions of information represented by the plurality of signals,
c) reaching a predetermined data volume while picking up the plurality of signals, and
d) a maximum window length predefined by the vehicle-external entity.

* * * * *